United States Patent
Eto

(10) Patent No.: US 8,265,799 B2
(45) Date of Patent: Sep. 11, 2012

(54) CIRCUIT FOR CONTROLLING DYNAMIC ROTATION SPEED OF FAN, METHOD OF CONTROLLING DYNAMIC ROTATION SPEED OF FAN, AND PROGRAM FOR CONTROLLING DYNAMIC ROTATION SPEED OF FAN

(75) Inventor: Jun Eto, Yamanashi (JP)

(73) Assignee: NEC Computertechno, Ltd., Tokyo (JP)

( * ) Notice: Subject to any disclaimer, the term of this patent is extended or adjusted under 35 U.S.C. 154(b) by 273 days.

(21) Appl. No.: 12/717,751

(22) Filed: Mar. 4, 2010

(65) Prior Publication Data
US 2010/0228403 A1 Sep. 9, 2010

(30) Foreign Application Priority Data
Mar. 6, 2009 (JP) .................. 2009-053507

(51) Int. Cl.
*G06F 19/00* (2011.01)
(52) U.S. Cl. .................. 700/300; 361/679.54
(58) Field of Classification Search .................. 700/300; 361/679.54
See application file for complete search history.

(56) References Cited

U.S. PATENT DOCUMENTS

| | | | |
|---|---|---|---|
| 5,962,933 A * | 10/1999 | Henderson et al. | 307/126 |
| 6,535,382 B2 * | 3/2003 | Bishop et al. | 361/690 |
| 6,826,456 B1 * | 11/2004 | Irving et al. | 700/299 |
| 6,856,139 B2 * | 2/2005 | Rijken et al. | 324/537 |
| 7,331,532 B2 * | 2/2008 | Currie et al. | 236/49.3 |
| 2002/0149911 A1 * | 10/2002 | Bishop et al. | 361/690 |
| 2005/0275365 A1 * | 12/2005 | Currie et al. | 318/471 |
| 2009/0323277 A1 * | 12/2009 | Hosokawa | 361/679.54 |

FOREIGN PATENT DOCUMENTS

| | | |
|---|---|---|
| JP | 1-291000 A | 11/1989 |
| JP | 2002373034 A | 12/2002 |
| JP | 2003248530 A | 9/2003 |
| JP | 2005190294 A | 7/2005 |
| JP | 2006172269 A | 6/2006 |
| JP | 2006330913 A | 12/2006 |
| JP | 2007172042 A | 7/2007 |
| JP | 2007179437 A | 7/2007 |

OTHER PUBLICATIONS

Japanese Office Action for JP2009-053507 dated Feb. 15, 2011.
Japanese Office Action for JP2009-053507 dated Jul. 1, 2011.

* cited by examiner

*Primary Examiner* — Michael D Masinick

(57) ABSTRACT

A first reception unit receives "ambient temperature" which is a temperature of surroundings where the computer is installed. A second reception unit receives "first device temperature" which is a temperature of a first device provided in the computer. A third reception unit receives "second device temperature" which is a temperature of a second device provided in the computer. A fan rotation speed indicating unit determines the rotation speed of the fan based on a comparison between the ambient temperature, first device temperature, and second device temperature which are received by the first to third reception units and a fan rotation speed description table describing a relationship between the respective temperature and fan rotation speed and instructs the fan to rotate at the determined rotation speed.

16 Claims, 5 Drawing Sheets

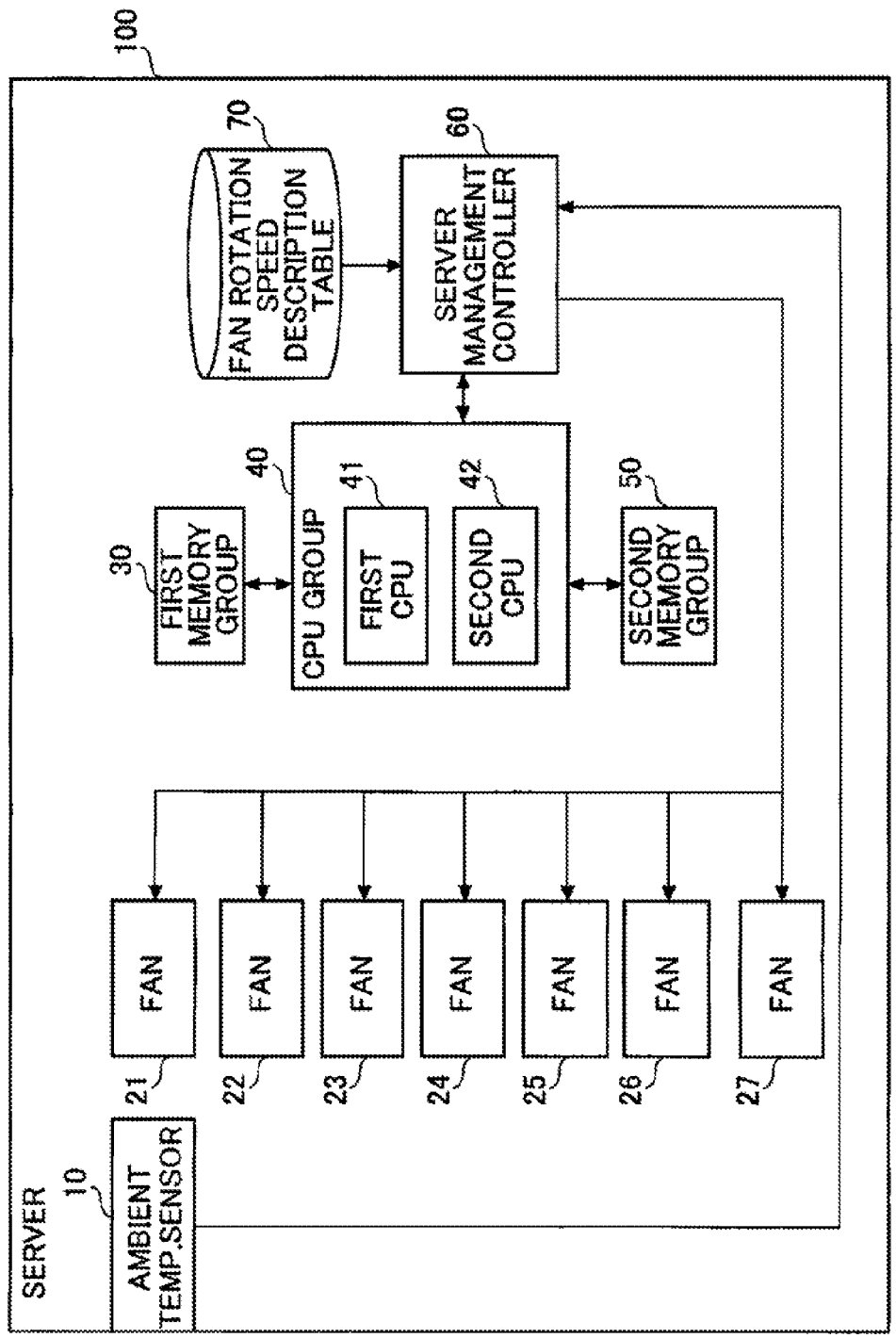

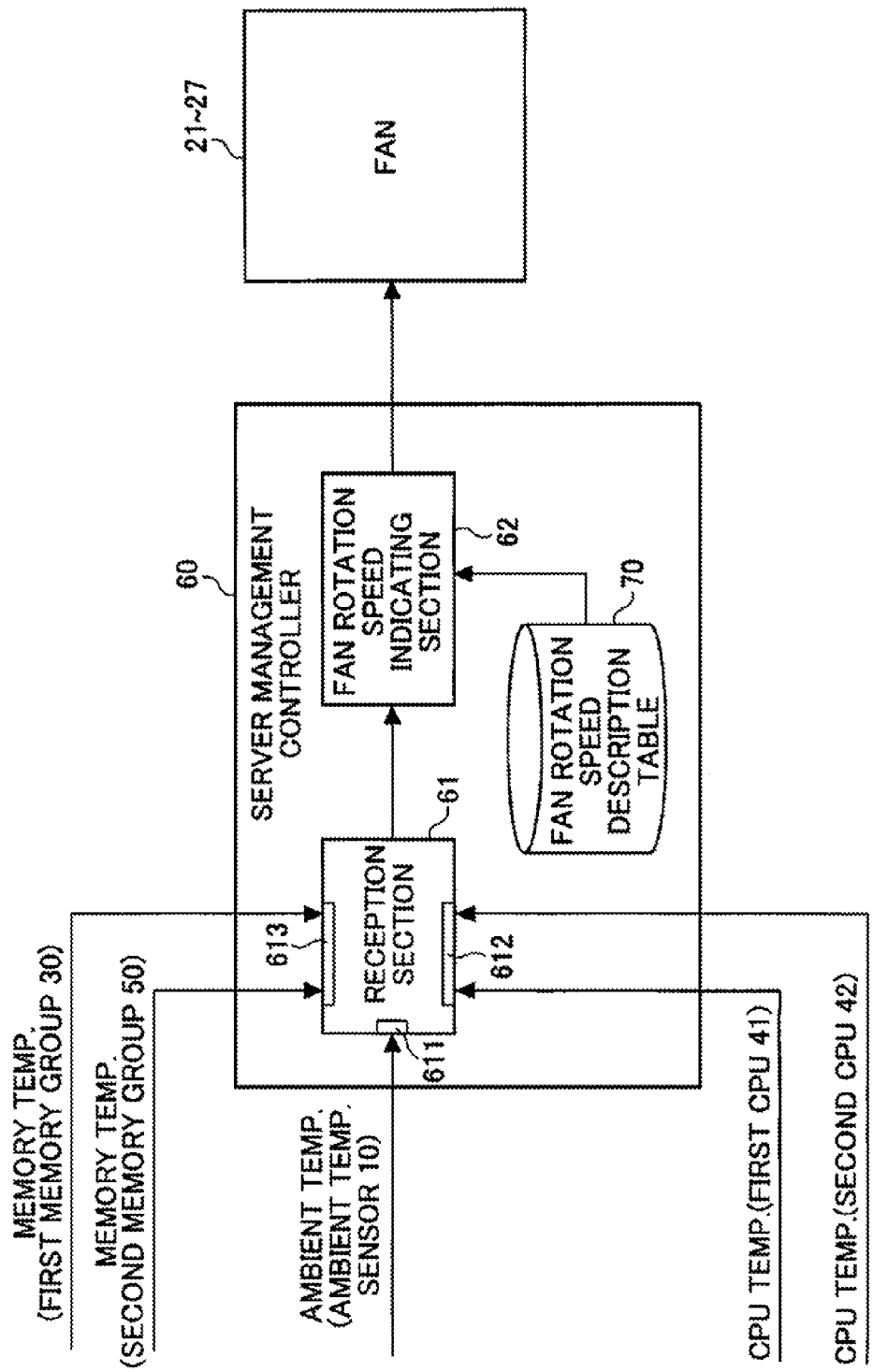

FIG.3

INDIVIDUAL TABLE A USED AT AMBIENT TEMP. OF 25°C OR LESS

| CPU TEMP. | ~58°C | 59°C~63°C | 64°C~69°C | 70°C~ |
|---|---|---|---|---|
| FAN ROTATION SPEED | 5350rpm | 6900rpm | 7700rpm | 8200rpm |
| MEMORY TEMP. | ~66°C | 67°C~71°C | 72°C~85°C | 86°C~ |
| FAN ROTATION SPEED | 3200rpm | 4400rpm | 5350rpm | 15800rpm |

INDIVIDUAL TABLE B USED AT AMBIENT TEMP. BETWEEN 26°C AND 30°C

| CPU TEMP. | ~58°C | 59°C~63°C | 64°C~69°C | 70°C~ |
|---|---|---|---|---|
| FAN ROTATION SPEED | 5900rpm | 7800rpm | 8350rpm | 9000rpm |
| MEMORY TEMP. | ~71°C | 72°C~80°C | 81°C~85°C | 86°C~ |
| FAN ROTATION SPEED | 3200rpm | 4950rpm | 6450rpm | 15800rpm |

INDIVIDUAL TABLE C USED AT AMBIENT TEMP. BETWEEN 31°C AND 35°C

| CPU TEMP. | ~58°C | 59°C~63°C | 64°C~69°C | 70°C~ |
|---|---|---|---|---|
| FAN ROTATION SPEED | 6950rpm | 7800rpm | 8350rpm | 9000rpm |
| MEMORY TEMP. | ~76°C | 77°C~82°C | 83°C~85°C | 86°C~ |
| FAN ROTATION SPEED | 3200rpm | 5900rpm | 8700rpm | 15800rpm |

INDIVIDUAL TABLE D USED AT AMBIENT TEMP. OF 36°C OR MORE

| CPU TEMP. | ~58°C | 59°C~63°C | 64°C~69°C | 70°C~ |
|---|---|---|---|---|
| FAN ROTATION SPEED | 15800rpm | 15800rpm | 15800rpm | 15800rpm |
| MEMORY TEMP. | ~76°C | 77°C~82°C | 83°C~85°C | 86°C~ |
| FAN ROTATION SPEED | 15800rpm | 15800rpm | 15800rpm | 15800rpm |

FIG.5

| AMBIENT TEMP. | ~25°C | 26°C~30°C | 31°C~35°C | 36°C~ |
|---|---|---|---|---|
| FAN ROTATION SPEED | 8200rpm | 9000rpm | 9850rpm | 15800rpm |

CIRCUIT FOR CONTROLLING DYNAMIC ROTATION SPEED OF FAN, METHOD OF CONTROLLING DYNAMIC ROTATION SPEED OF FAN, AND PROGRAM FOR CONTROLLING DYNAMIC ROTATION SPEED OF FAN

The present application claims priority based on Japanese patent application No. 2009-053507 filed on Mar. 6, 2009.

TECHNICAL FIELD

The present invention relates to control of the dynamic rotation speed of a cooling fan provided in a computer and, particularly to a circuit for controlling the dynamic rotation speed of fan, method of controlling the dynamic rotation speed of fan, and a program for controlling the dynamic rotation speed of fan.

BACKGROUND ART

In a computer, as typified by a server in a computer network system, etc., temperature rises as the operation of a CPU or a memory proceeds. In particular, due to recent advances in CPU performance, the temperature rise is noticeable. In order to prevent such a temperature rise, a method is generally employed in which a cooling fan is provided in the computer such as server, etc. so as to cool the inside of the computer.

However, a rotation of the cooling fan, which generates noise, is one of the major noise source of the computer such as server. In general, the fan rotation speed is controlled taking the computer's peak load state into consideration, so that the fan rotation speed in the low load state of the computer is excessively high in terms of cooling purpose, and noise is unnecessarily loud.

In view of the above point, a method for reducing noise of a cooling fan for a computer used as communication control device is proposed (refer to, e.g., PTL 1).

Further, PTL 2 discloses a technique that provides a temperature sensor for a CPU and rotates a cooling fan at a rotation speed previously set as the maximum allowable rotation speed for the temperature detected by the sensor. In this technique, the CPU clock is controlled so as to perform sufficient cooling of the computer with the set rotation speed of the fan. With this technique, it is possible to provide user's desired quietness.

CITATION LIST

Patent Literature

{PTL 1} JP-A-01-291000
{PTL 2} JP-A-2005-190294

SUMMARY OF INVENTION

Technical Problem

With the techniques disclosed in PTL 1 and PTL 2, however, it is not possible to solve the problem that the fan rotation speed in the low load state of the computer is excessively high in terms of cooling purpose. Further, the technique of PTL 2 has a problem that the CPU operation speed gets lowered.

A method is conceivable in which when the CPU temperature exceeds a previously set threshold, cooling operation by means of the fan is stopped (fan rotation is stopped) and, instead thereof, another different cooling device that generates less noise is activated so as to achieve both cooling and noise reduction. In this case, however, another cooling device needs to be provided in addition to the fan, resulting in an increase in cost and difficulty in achieving space saving.

An object of the present invention is to provide an improvement in control of a cooling fan provided in a computer and particularly, to provide a dynamic rotation speed control circuit or device of a fan, a dynamic rotation speed control method of a fan, and a dynamic rotation speed control program of a fan capable of preventing a fan from rotating at an excess speed while the computer is in a low load state even without providing a cooling device other than the fan.

Solution to Problem

According to a first aspect of the present invention, there is provided a dynamic rotation speed control circuit that controls the dynamic rotation speed of a fan provided in a computer, comprising:
 a first reception unit for receiving "ambient temperature" which is a temperature of surroundings where the computer is installed;
 a second reception unit for receiving "first device temperature" which is a temperature of a first device provided in the computer;
 a third reception unit for receiving "second device temperature" which is a temperature of a second device provided in the computer; and
 a fan rotation speed indicating unit for determining the rotation speed of the fan based on a comparison between the ambient temperature, first device temperature, and second device temperature which are received by the first to third reception units and a fan rotation speed description table describing a relationship between the respective temperature and fan rotation speed and instructing the fan to rotate at the determined rotation speed.

According to a second aspect of the present invention, there is provided a computer that includes a first device, a second device, a fan, and a dynamic rotation speed control device capable of controlling the dynamic rotation speed of the fan, wherein the dynamic rotation speed control device comprises the above-mentioned dynamic rotation speed control circuit.

According to a third aspect of the present invention, there is provided a dynamic rotation speed control method that controls the dynamic rotation speed of a fan provided in a computer, comprising:
 a first reception step of receiving "ambient temperature" which is a temperature of surroundings where the computer is installed;
 a second reception step of receiving "first device temperature" which is a temperature of a first device provided in the computer;
 a third reception step of receiving "second device temperature" which is a temperature of a second device provided in the computer; and
 a fan rotation speed indicating step of determining the rotation speed of the fan based on a comparison between the ambient temperature, first device temperature, and second device temperature which are received in the first to third reception steps and a fan rotation speed description table describing a relationship between the respective temperature and fan rotation speed and instructing the fan to rotate at the determined rotation speed.

According to a fourth aspect of the present invention, there is provided a dynamic rotation speed control program that controls the dynamic rotation speed of a fan provided in a computer, for enabling the computer to execute:

a first reception step of receiving "ambient temperature" which is a temperature of surroundings where the computer is installed;

a second reception step of receiving "first device temperature" which is a temperature of a first device provided in the computer;

a third reception step of receiving "second device temperature" which is a temperature of a second device provided in the computer; and a fan rotation speed indicating step of determining the rotation speed of the fan based on a comparison between the ambient temperature, first device temperature, and second device temperature which are received in the first to third reception steps and a fan rotation speed description table describing a relationship between the respective temperature and fan rotation speed and instructing the fan to rotate at the determined rotation speed.

Advantageous Effects of Invention

According to the present invention, in the control of a cooling fan provided in a computer, it is possible to prevent the fan from rotating at an excess speed in terms of cooling purpose while the computer is in a low load state, thereby reducing noise.

BRIEF DESCRIPTION OF DRAWINGS

FIG. 1 A block diagram showing a basic configuration of an embodiment of the present invention.

FIG. 2 A block diagram showing a basic configuration of a server management controller in the embodiment of the present invention.

FIG. 3 A diagram showing a configuration of a fan rotation speed description table in the embodiment of the present invention.

FIG. 5 A diagram showing a configuration of a conventional fan rotation speed setting table.

DESCRIPTION OF EMBODIMENTS

Figure 4:
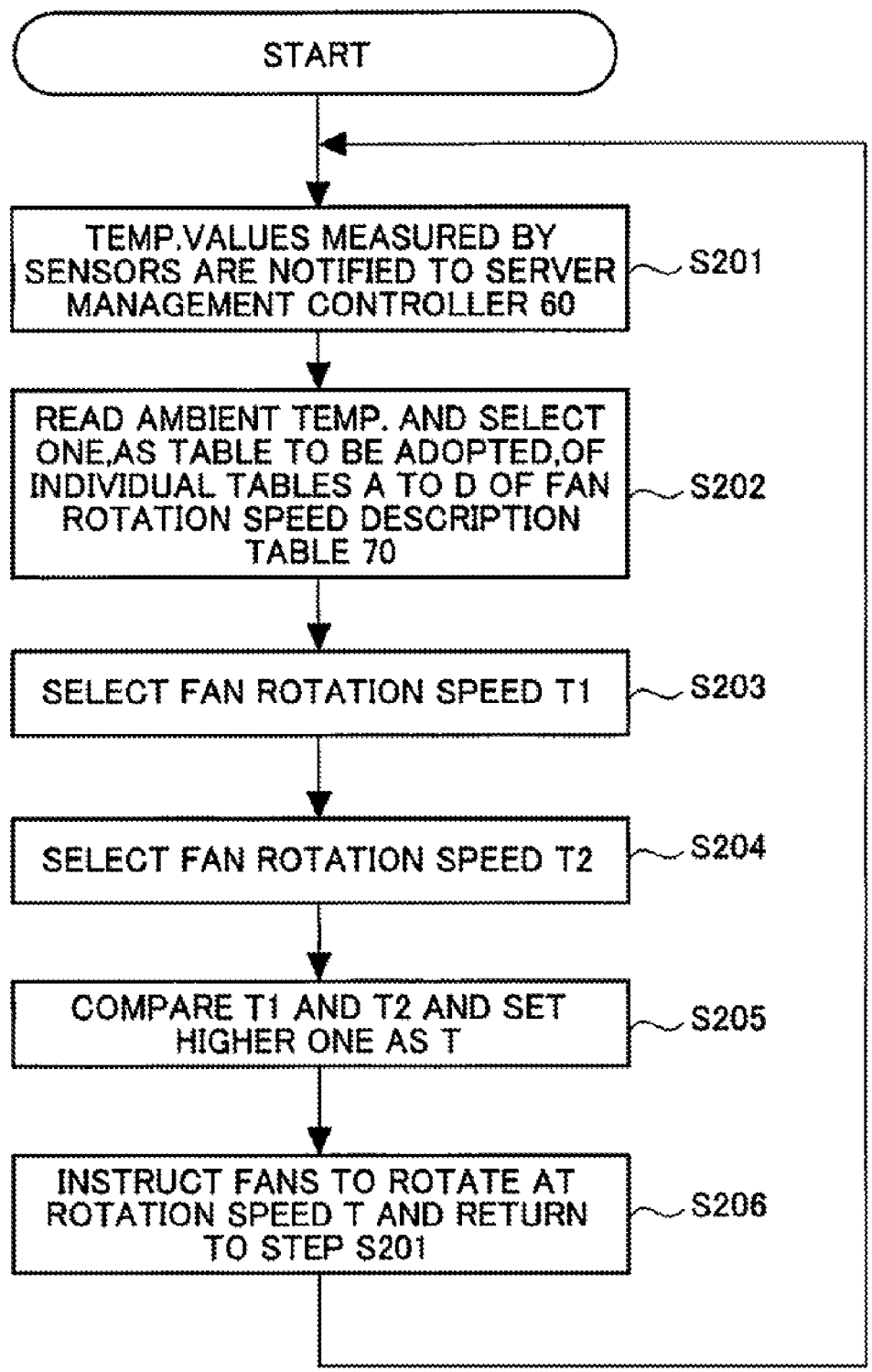
FIG. 4 A flowchart showing a basic operation of the server management controller in the embodiment of the present invention.

An embodiment of the present invention will be described in detail below with reference to the accompanying drawings.

Referring to a block diagram of FIG. 1, a server 100 as a computer according to an embodiment of the present invention includes an ambient temperature sensor 10, fans 21 to 27, a first memory group 30, a CPU group 40, a second memory group 50, a server management controller 60, and a fan rotation speed description table 70. The CPU group 40 includes a first CPU 41 and a second CPU 42.

In the server 100, seven fans (fans 21 to 27) are used to cool the CPUs and memories, i.e. the first CPU 41 and the second CPU 42 in the CPU group 40, and the memories in the first memory group 30 and the second memory group 50. A temperature sensor (ambient temperature sensor 10) is installed at the front portion (on the suction side) of the server 100. CPUs (the first CPU 41 and the second CPU 42: up to two CPUs are supposed to be installed in the present embodiment) each incorporate a CPU temperature sensor for measuring the internal temperature of CPU. Memories (the memories in the first memory group 30 and the second memory group 50: twelve memories are supposed to be installed in total in the present embodiment) each incorporate a memory temperature sensor for measuring the internal temperature of memory. The server management controller 60 manages the entire operation of the server having a fan control function and a temperature sensor reading function. In this embodiment, the server management controller 60 is realized by an LSI (Large Scale Integration).

In the present embodiment, roughly speaking, software of the server management controller 60 controls the cooling fan rotation speed based on received input values of the ambient temperature sensor, CPU temperature sensor and memory temperature sensor provided in the server 100 so as to achieve both a noise reduction and optimum cooling effects.

Although the present embodiment is applied to the server, the present embodiment is equally applicable to any apparatus having a fan for cooling purpose, and usage of the apparatus is not limited to the server. Further, the number of CPUs, number of memories, number of fans may be changed.

A concrete configuration of the embodiment will be further described with reference to the block diagram of FIG. 1.

The ambient temperature sensor 10 is provided in a suction portion of the server 100 and measures the temperature (hereinafter, referred to as "ambient temperature") of the surroundings where the server 100 is installed. Further, the ambient temperature sensor 10 notifies the server management controller 60 of the measured ambient temperature.

The fans 21 to 27 operate so as to cool the server 100. According to an instruction from the server management controller 60, the fans 21 to 27 change their rotation speed per unit time.

The CPU group 40 is a computation processing unit operating in the server 100. The CPU group 40 has a function as the CPU temperature sensor that measures the internal temperature of the CPU (hereinafter, referred to as "CPU temperature") and notify the server management controller 60 of the measured CPU temperature. That is, the first CPU 41 and the second CPU 42 in the CPU group 40 each functions as the first device of the present invention, and the CPU temperature corresponds to the first device temperature of the present invention.

The first and second memory groups 30 and 50 have memories utilized by the CPU group 40. The memories of the first and second memory groups 30 and 50 each have a function as the memory temperature sensor that measures the internal temperature of the memory (hereinafter, referred to as "memory temperature") and notify the server management controller 60 of the measured memory temperature. That is, the memories of the first and second memory groups 30 and 50 each functions as the second device of the present invention, and the memory temperature corresponds the second device temperature of the present invention.

The server management controller 60 (corresponding to "dynamic rotation speed control circuit" of the present invention) performs dynamic rotation speed control of the fans 21 to 27 according to the notified temperatures. FIG. 2 is a block diagram showing a configuration of the server management controller 60 of the present embodiment and dynamic rotation speed control executed thereby. Referring to FIG. 2, the server management controller 60 includes a reception section 61, a fan rotation speed indicating section 62, and a fan rotation speed description table 70. The reception section 61 has a first reception unit (first reception means) 611 for receiving the above ambient temperature, a second reception unit (second reception means) 612 for receiving the above CPU temperature, and a third reception unit (third reception means) 613 for receiving the above memory temperature. The fan rotation speed description table 70 may be stored or included in the server management controller 60 as shown in FIG. 2, or alternatively may be excluded therefrom while being stored or included in the server 100 as shown in FIG. 1.

The reception section 61 reads the CPU temperature (a plurality of CPU temperatures), memory temperature (a plurality of memory temperatures), and ambient temperature, and the fan rotation speed indicating section 62 indicates a rotation speed of the fans 21 to 27. That is, the fan rotation speed indicating section 62 functions as the fan rotation speed indicating unit of the present invention, which determines the rotation speed of the fans 21 to 27 based on a comparison between the ambient temperature, first device temperature, and second device temperature which are received by the first to third reception units 611 to 613 and the fan rotation speed description table 70 describing a relationship between the respective temperature and fan rotation speed and instructs the fans to rotate at the determined rotation speed, as explained below in detail.

Next, the fan rotation speed description table 70 will be described using a concrete example shown in FIG. 3. FIG. 3 is a table describing temperature values obtained by converting a CPU load and a memory load into temperatures ("CPU temperature" and "memory temperature") for each ambient temperature segment and fan rotation speed required for the cooling operation at the corresponding temperature values. In FIG. 3, four individual tables A to D for fan rotation speed setting included in the fan rotation speed description table 70 are shown for each ambient temperature segment. Here, the premise of the control performed in the present embodiment will be described. In general, when a low load is applied to software, both the CPU and memory generate less heat. Accordingly, the temperatures of the CPU and memory are low and therefore a proportional relation is established between the load and temperature. That is, it is the premise of the control performed in the present embodiment that the loads on the CPU and memory can be converted into a temperature value.

The values of the individual tables are determined in prior evaluation and stored in the fan rotation speed description table 70. The fan rotation speed description table 70 may be provided independently of the server management controller 60 as shown in FIG. 1 or may be stored in the server management controller 60 as shown in FIG. 2.

The value of the fan rotation speed in the fan rotation speed description table 70 is set in a stepwise increasing manner with respect to the temperature as shown in FIG. 3. In this regard, another approach may be possible in which a relationship between the temperature and rotation speed is regarded as a proportional relationship based on a certain relational expression. Actually, however, the relationship between the heat generation and fan rotation speed is not linear, but is represented by a quadratic curve (Exp curve), so that there may be a case where the above approach does not fit to cooling issue.

Even when the relationship between the temperature and rotation speed assumes the quadratic curve, there may be assumed that roar noise is generated by the fan. Thus, in order to solve the above problems, the value of the fan rotation speed in the fan rotation speed description table 70 is set in a stepwise increasing manner with respect to the temperature as shown in FIG. 3.

Next, an operation in which the server management controller 60 uses the fan rotation speed description table 70 to indicate the rotation speed of the fans 21 to 27 will be described with reference to a flowchart shown in FIG. 4. While the server 100 is running, the server management controller 60 performs online processing through cooperation between software and hardware to notify the fans 21 to 27 of the rotation speed.

First, the temperature values measured by the ambient temperature sensor 10, first memory group 30, CPU group 40, and second memory group 50 are notified to the server management controller 60 (step S201).

Upon reception of the notification, the server management controller 60 first reads the ambient temperature and selects one, as an individual table to be adopted for fan rotation speed setting, of the individual tables A to D of the fan rotation speed description table 70 in FIG. 4 (step S202).

Then, the server management controller 60 reads the CPU temperature and selects a fan rotation speed (hereinafter, referred to as "T1") from the individual table selected in the step S202 (step S203). In the case where there exist a plurality of CPUs (the first CPU 41 and the second CPU 42) as in the present embodiment, the server management controller 60 reads the highest CPU temperature.

Subsequently, the server management controller 60 reads the memory temperature and selects a fan rotation speed (hereinafter, referred to as "T2") from the individual table selected in the step S202 (step S204). As in the case of the CPU temperature, in the case where there exist a plurality of memories, the server management controller 60 reads the highest memory temperature.

The server management controller 60 then compares the values of T1 and T2 and sets the higher one as T (step S205).

The server management controller 60 instructs the fans 21 to 27 to rotate at the rotation speed T and returns to step S201 (step S206).

That is, the fan rotation speed indicating section 62 selects one of the plurality of individual tables A to D that corresponds to the ambient temperature received by the first reception unit 611, determines a first rotation speed T1 based on a comparison between the selected individual table and first device temperature received by the second reception unit 612, determines a second rotation speed T2 based on a comparison between the selected individual table and second device temperature received by the third reception unit 613, and instructs the fans 21 to 27 to rotate at a higher one of the first and second rotation speeds T1 and T2.

From another point of view, there is carried out in the present embodiment a dynamic rotation speed control method that controls the dynamic rotation speed of the fans 21 to 27 provided in the server 100, comprising:

a first reception step of receiving the ambient temperature;

a second reception step of receiving the first device temperature (CPU temperature);

a third reception step of receiving the second device temperature (memory temperature); and a fan rotation speed indicating step of determining the rotation speed of the fan based on a comparison between the ambient temperature, first device temperature, and second device temperature which are received in the first to third reception steps and a fan rotation speed description table 70 describing a relationship between the respective temperature and fan rotation speed and instructing the fans 21 to 27 to rotate at the determined rotation speed.

With the above processing, it is possible to make the fan 21 to 27 rotate at an adequate rotation speed in accordance with the load of the server 100.

Here, a conventional fan rotation speed setting table is shown in FIG. 5 in order to make the effect of the present invention clear.

As shown in FIG. 5, the fan rotation speed has conventionally been controlled based on only the ambient temperature, and the fan rotation speed has been determined assuming a state where the CPU load and memory load are highest. On the other hand, in the present invention, as can be seen from the fan rotation speed description table 70 of FIG. 3, the fan rotation speed at the ambient temperature of 35° C. or less is lower than that in FIG. 5 at the time when the CPU load and memory load are low.

Thus, with use of the fan rotation speed description table 70 of FIG. 3, it is possible to make the fans 21 to 27 rotate more adequately. This reduces noise and power consumption associated with the fan rotation.

Further, in the present embodiment, the fan rotation speed is determined based on a comparison between the fan rotation speed description table 70 describing a relationship between the temperature and fan rotation speed and temperatures detected in the server 100. This eliminates the need to additionally provide a temperature feedback circuit (or software) which is used in a technique in which the temperature feed back circuit (or software) is provided so as to control the fan rotation speed so that the device temperature (CPU temperature) is kept at a constant value.

Further, the present embodiment can cope with a case where it is not clear which fan cools which device due to complicated internal structure of the server 100.

The above dynamic rotation speed control of the present embodiment can be realized by hardware, software, or a combination thereof. According to the present invention, there is provided a dynamic rotation speed control program that controls the dynamic rotation speed of the fans 21 to 27 provided in the server 100, for enabling the server 100 to execute the above first to third reception steps and fan rotation speed indicating step of the above dynamic rotation speed control method.

Although the above embodiment is a preferred embodiment of the present invention, the scope of the present invention is not limited to the above embodiment, and various modifications may be made to the embodiment without departing from the scope of the present invention.

For example, although the CPU temperature and memory temperature are used as reference values in the present embodiment, a temperature sensor may be provided in another device (e.g., HDD or VGA: Video Graphics Array) so as to make the temperature of this device taken into consideration as a reference temperature. Further, although the temperature sensor is incorporated in all the memories and CPUs in the present embodiment, it need not be incorporated in all of the memories and CPUs. For example, the temperature sensor may be incorporated only in one of the adjacently disposed memories.

In addition, as described above, the number of CPUs, number of memories, number of fans may be changed in the present embodiment.

The above has described the present invention with reference to the embodiments. However, the present invention is not limited to the above-described embodiments. It should be understood by those skilled in the art that various modifications may be made in the configuration and details of the present invention insofar as they are within the scope of the present invention.

The present application is based upon and claims the benefit of priority from prior Japanese Patent Application No. 2009-53507, filed with Japan Patent Office on Mar. 6, 2009, the entire contents of which are incorporated herein by reference.

The whole or part of the embodiments disclosed above can be described as, but not limited to, the following supplementary notes.

(Supplementary Note 1)

A dynamic rotation speed control circuit that controls the dynamic rotation speed of a fan provided in a computer, comprising:

a first reception unit for receiving "ambient temperature" which is a temperature of surroundings where the computer is installed;

a second reception unit for receiving "first device temperature" which is a temperature of a first device provided in the computer;

a third reception unit for receiving "second device temperature" which is a temperature of a second device provided in the computer; and a fan rotation speed indicating unit for determining the rotation speed of the fan based on a comparison between the ambient temperature, first device temperature, and second device temperature which are received by the first to third reception units and a fan rotation speed description table describing a relationship between the respective temperature and fan rotation speed and instructing the fan to rotate at the determined rotation speed.

(Supplementary Note 2)

The dynamic rotation speed control circuit according to Supplementary note 1, wherein the fan rotation speed description table includes a plurality of individual tables for each of ambient temperature segments, and the fan rotation speed indicating unit selects one of the plurality of individual tables that corresponds to the received ambient temperature, determines a first rotation speed based on a comparison between the selected individual table and first device temperature received by the second reception unit, determines a second rotation speed based on a comparison between the selected individual table and second device temperature received by the third reception unit, and instructs the fan to rotate at a higher one of the first and second rotation speeds.

(Supplementary Note 3)

The dynamic rotation speed control circuit according to Supplementary note 1 or 2, wherein at least one of the first and second devices are provided in plural numbers, and the first or second device temperature is the highest temperature of the plurality of first or second devices.

(Supplementary Note 4)

The dynamic rotation speed control circuit according to any one of Supplementary notes 1 to 3, wherein the value of the fan rotation speed is set in a stepwise increasing manner with respect to the temperature in the fan rotation speed description table.

(Supplementary Note 5)

The dynamic rotation speed control circuit according to any one of Supplementary notes 1 to 4, wherein the first device is a CPU (Central processing Unit), and the second device is a memory.

(Supplementary Note 6)

A computer that includes a first device, a second device, a fan, and a dynamic rotation speed control device capable of controlling the dynamic rotation speed of the fan, wherein the dynamic rotation speed control device comprises the dynamic rotation speed control circuit according to any one of Supplementary notes 1 to 5.

(Supplementary Note 7)

A dynamic rotation speed control method that controls the dynamic rotation speed of a fan provided in a computer, comprising:

a first reception step of receiving "ambient temperature" which is a temperature of surroundings where the computer is installed;

a second reception step of receiving "first device temperature" which is a temperature of a first device provided in the computer;

a third reception step of receiving "second device temperature" which is a temperature of a second device provided in the computer; and a fan rotation speed indicating step of determining the rotation speed of the fan based on a comparison between the ambient temperature, first device temperature, and second device temperature which are received in the first to third reception steps and a fan rotation speed description table describing a relationship between the respective temperature and fan rotation speed and instructing the fan to rotate at the determined rotation speed.

(Supplementary Note 8)

The dynamic rotation speed control method according to Supplementary note 7, wherein the fan rotation speed description table includes a plurality of individual tables for each of ambient temperature segments, and in the fan rotation speed indicating step, there is selected one of the plurality of individual tables that corresponds to the received ambient temperature, determined a first rotation speed based on a comparison between the selected individual table and first device temperature received in the second reception step, determined a second rotation speed based on a comparison between the selected individual table and second device temperature received by the third reception step, and there is instructed the fan to rotate at a higher one of the first and second rotation speeds.

(Supplementary Note 9)

The dynamic rotation speed control method according to Supplementary note 7 or 8, wherein at least one of the first and second devices are provided in plural numbers, and the first or second device temperature is the highest temperature of the plurality of first or second devices.

(Supplementary Note 10)

The dynamic rotation speed control method according to any one of Supplementary notes 7 to 9, wherein the value of the fan rotation speed is set in a stepwise increasing manner with respect to the temperature in the fan rotation speed description table.

(Supplementary Note 11)

The dynamic rotation speed control method according to any one of Supplementary notes 7 to 10, wherein the first device is a CPU (Central processing Unit), and the second device is a memory.

(Supplementary Note 12)

A dynamic rotation speed control program that controls the dynamic rotation speed of a fan provided in a computer, for enabling the computer to execute:

a first reception step of receiving "ambient temperature" which is a temperature of surroundings where the computer is installed;

a second reception step of receiving "first device temperature" which is a temperature of a first device provided in the computer;

a third reception step of receiving "second device temperature" which is a temperature of a second device provided in the computer; and a fan rotation speed indicating step of determining the rotation speed of the fan based on a comparison between the ambient temperature, first device temperature, and second device temperature which are received in the first to third reception steps and a fan rotation speed description table describing a relationship between the respective temperature and fan rotation speed and instructing the fan to rotate at the determined rotation speed.

(Supplementary Note 13)

The dynamic rotation speed control program according to Supplementary note 12, wherein the fan rotation speed description table includes a plurality of individual tables for each of ambient temperature segments, and in the fan rotation speed indicating step, there is selected one of the plurality of individual tables that corresponds to the received ambient temperature, determined a first rotation speed based on a comparison between the selected individual table and first device temperature received in the second reception step, determined a second rotation speed based on a comparison between the selected individual table and second device temperature received by the third reception step, and there is instructed the fan to rotate at a higher one of the first and second rotation speeds.

(Supplementary Note 14)

The dynamic rotation speed control program according to Supplementary note 12 or 13, wherein at least one of the first and second devices are provided in plural numbers, and the first or second device temperature is the highest temperature of the plurality of first or second devices.

(Supplementary Note 15)

The dynamic rotation speed control program according to any one of Supplementary notes 12 to 14, wherein the value of the fan rotation speed is set in a stepwise increasing manner with respect to the temperature in the fan rotation speed description table.

(Supplementary Note 16)

The dynamic rotation speed control program according to any one of Supplementary notes 12 to 15, wherein the first device is a CPU (Central processing Unit), and the second device is a memory.

(Supplementary Note 17)

The dynamic rotation speed control program according to any one of Supplementary notes 12 to 16, wherein the computer functions as a dynamic rotation speed control circuit which comprises:

a first reception means for receiving "ambient temperature" which is a temperature of surroundings where the computer is installed;

a second reception means for receiving "first device temperature" which is a temperature of a first device provided in the computer;

a third reception means for receiving "second device temperature" which is a temperature of a second device provided in the computer; and a fan rotation speed indicating means for determining the rotation speed of the fan based on a comparison between the ambient temperature, first device temperature, and second device temperature which are received by the first to third reception means and a fan rotation speed description table describing a relationship between the respective temperature and fan rotation speed and instructing the fan to rotate at the determined rotation speed.

(Supplementary Note 18)

The dynamic rotation speed control program according to Supplementary note 17, wherein
 the fan rotation speed description table includes a plurality of individual tables for each of ambient temperature segments, and
 the fan rotation speed indicating means selects one of the plurality of individual tables that corresponds to the received ambient temperature, determines a first rotation speed based on a comparison between the selected individual table and first device temperature received by the second reception unit, determines a second rotation speed based on a comparison between the selected individual table and second device temperature received by the third reception unit, and instructs the fan to rotate at a higher one of the first and second rotation speeds.

(Supplementary Note 19)

The dynamic rotation speed control program according to Supplementary note 17 or 18, wherein
 at least one of the first and second devices are provided in plural numbers, and
 the first or second device temperature is the highest temperature of the plurality of first or second devices.

(Supplementary Note 20)

The dynamic rotation speed control program according to any one of Supplementary notes 17 to 19, wherein the value of the fan rotation speed is set in a stepwise increasing manner with respect to the temperature in the fan rotation speed description table.

The invention claimed is:

1. A dynamic rotation speed control circuit that controls the dynamic rotation speed of a fan provided in a computer, comprising:
 a first reception unit for receiving "ambient temperature" which is a temperature of surroundings where the computer is installed;
 a second reception unit for receiving "first device temperature" which is a temperature of a first device provided in the computer;
 a third reception unit for receiving "second device temperature" which is a temperature of a second device provided in the computer; and
 a fan rotation speed indicating unit for determining the rotation speed of the fan based on a comparison between the ambient temperature, first device temperature, and second device temperature which are received by the first to third reception units and a fan rotation speed description table describing a relationship between the respective temperature and fan rotation speed and instructing the fan to rotate at the determined rotation speed, wherein:
 the fan rotation speed description table includes a plurality of individual tables for each of ambient temperature segments, and
 the fan rotation speed indicating unit selects one of the plurality of individual tables that corresponds to the received ambient temperature, determines a first rotation speed based on a comparison between the selected individual table and first device temperature received by the second reception unit, determines a second rotation speed based on a comparison between the selected individual table and second device temperature received by the third reception unit, and instructs the fan to rotate at a higher one of the first and second rotation speeds.

2. The dynamic rotation speed control circuit according to claim 1, wherein
 at least one of the first and second devices are provided in plural numbers, and
 the first or second device temperature is the highest temperature of the plurality of first or second devices.

3. The dynamic rotation speed control circuit according to claim 1, wherein the value of the fan rotation speed is set in a stepwise increasing manner with respect to the temperature in the fan rotation speed description table.

4. The dynamic rotation speed control circuit according to claim 1, wherein the first device is a CPU (Central processing Unit), and the second device is a memory.

5. A computer that includes a first device, a second device, a fan, and a dynamic rotation speed control device capable of controlling the dynamic rotation speed of the fan, wherein the dynamic rotation speed control device comprises the dynamic rotation speed control circuit as claimed in claim 1.

6. A dynamic rotation speed control method that controls the dynamic rotation speed of a fan provided in a computer, comprising:
 a first reception step of receiving "ambient temperature" which is a temperature of surroundings where the computer is installed;
 a second reception step of receiving "first device temperature" which is a temperature of a first device provided in the computer;
 a third reception step of receiving "second device temperature" which is a temperature of a second device provided in the computer; and
 a fan rotation speed indicating step of determining the rotation speed of the fan based on a comparison between the ambient temperature, first device temperature, and second device temperature which are received in the first to third reception steps and a fan rotation speed description table describing a relationship between the respective temperature and fan rotation speed and instructing the fan to rotate at the determined rotation speed, wherein:
 the fan rotation speed description table includes a plurality of individual tables for each of ambient temperature segments, and
 in the fan rotation speed indicating step, there is selected one of the plurality of individual tables that corresponds to the received ambient temperature, determined a first rotation speed based on a comparison between the selected individual table and first device temperature received in the second reception step, determined a second rotation speed based on a comparison between the selected individual table and second device temperature received by the third reception step, and there is instructed the fan to rotate at a higher one of the first and second rotation speeds.

7. The dynamic rotation speed control method according to claim 6, wherein
 at least one of the first and second devices are provided in plural numbers, and
 the first or second device temperature is the highest temperature of the plurality of first or second devices.

8. The dynamic rotation speed control method according to claim 6, wherein the value of the fan rotation speed is set in a stepwise increasing manner with respect to the temperature in the fan rotation speed description table.

9. The dynamic rotation speed control method according to claim 6, wherein the first device is a CPU (Central processing Unit), and the second device is a memory.

10. A dynamic rotation speed control program that controls the dynamic rotation speed of a fan provided in a computer, for enabling the computer to execute:

a first reception step of receiving "ambient temperature" which is a temperature of surroundings where the computer is installed;

a second reception step of receiving "first device temperature" which is a temperature of a first device provided in the computer;

a third reception step of receiving "second device temperature" which is a temperature of a second device provided in the computer; and a fan rotation speed indicating step of determining the rotation speed of the fan based on a comparison between the ambient temperature, first device temperature, and second device temperature which are received in the first to third reception steps and a fan rotation speed description table describing a relationship between the respective temperature and fan rotation speed and instructing the fan to rotate at the determined rotation speed, wherein:

the fan rotation speed description table includes a plurality of individual tables for each of ambient temperature segments, and in the fan rotation speed indicating step, there is selected one of the plurality of individual tables that corresponds to the received ambient temperature, determined a first rotation speed based on a comparison between the selected individual table and first device temperature received in the second reception step, determined a second rotation speed based on a comparison between the selected individual table and second device temperature received by the third reception step, and there is instructed the fan to rotate at a higher one of the first and second rotation speeds.

11. The dynamic rotation speed control program according to claim 10, wherein at least one of the first and second devices are provided in plural numbers, and the first or second device temperature is the highest temperature of the plurality of first or second devices.

12. The dynamic rotation speed control program according to claim 10, wherein the value of the fan rotation speed is set in a stepwise increasing manner with respect to the temperature in the fan rotation speed description table.

13. The dynamic rotation speed control program according to claim 10, wherein the first device is a CPU (Central processing Unit), and the second device is a memory.

14. A dynamic rotation speed control program that controls the dynamic rotation speed of a fan provided in a computer, for enabling the computer to execute:

a first reception step of receiving "ambient temperature" which is a temperature of surroundings where the computer is installed;

a second reception step of receiving "first device temperature" which is a temperature of a first device provided in the computer;

a third reception step of receiving "second device temperature" which is a temperature of a second device provided in the computer; and a fan rotation speed indicating step of determining the rotation speed of the fan based on a comparison between the ambient temperature, first device temperature, and second device temperature which are received in the first to third reception steps and a fan rotation speed description table describing a relationship between the respective temperature and fan rotation speed and instructing the fan to rotate at the determined rotation speed, wherein:

the computer functions as a dynamic rotation speed control circuit which comprises:

a first reception means for receiving "ambient temperature" which is a temperature of surroundings where the computer is installed;

a second reception means for receiving "first device temperature" which is a temperature of a first device provided in the computer;

a third reception means for receiving "second device temperature" which is a temperature of a second device provided in the computer; and a fan rotation speed indicating means for determining the rotation speed of the fan based on a comparison between the ambient temperature, first device temperature, and second device temperature which are received by the first to third reception means and a fan rotation speed description table describing a relationship between the respective temperature and fan rotation speed and instructing the fan to rotate at the determined rotation speed;

the fan rotation speed description table includes a plurality of individual tables for each of ambient temperature segments; and the fan rotation speed indicating means selects one of the plurality of individual tables that corresponds to the received ambient temperature, determines a first rotation speed based on a comparison between the selected individual table and first device temperature received by the second reception unit, determines a second rotation speed based on a comparison between the selected individual table and second device temperature received by the third reception unit, and instructs the fan to rotate at a higher one of the first and second rotation speeds.

15. The dynamic rotation speed control program according to claim 14, wherein at least one of the first and second devices are provided in plural numbers, and the first or second device temperature is the highest temperature of the plurality of first or second devices.

16. The dynamic rotation speed control program according to claim 14, wherein the value of the fan rotation speed is set in a stepwise increasing manner with respect to the temperature in the fan rotation speed description table.

* * * * *